United States Patent
Nose et al.

(10) Patent No.: US 12,515,731 B2
(45) Date of Patent: Jan. 6, 2026

(54) VEHICLE CONTROL DEVICE

(71) Applicant: TOYOTA JIDOSHA KABUSHIKI KAISHA, Toyota (JP)

(72) Inventors: Masashi Nose, Nagoya (JP); Tomoaki Miyazawa, Nagoya (JP); Kazuya Kumazawa, Nagoya (JP); Miki Tsujino, Nagakute (JP); Tsukasa Kitazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 18/380,813

(22) Filed: Oct. 17, 2023

(65) Prior Publication Data

US 2024/0174285 A1 May 30, 2024

(30) Foreign Application Priority Data

Nov. 30, 2022 (JP) .................... 2022-191786

(51) Int. Cl.
| | |
|---|---|
| *B62D 5/04* | (2006.01) |
| *B60K 35/23* | (2024.01) |
| *B60K 35/28* | (2024.01) |
| *B62D 6/00* | (2006.01) |

(52) U.S. Cl.
CPC ............ *B62D 5/0457* (2013.01); *B60K 35/28* (2024.01); *B62D 6/001* (2013.01); *B60K 35/23* (2024.01); *B60K 2360/31* (2024.01)

(58) Field of Classification Search
CPC .... B62D 5/0457; B62D 6/001; B62D 15/025; B62D 15/0255; B60K 35/00; B60K 35/23; B60K 2360/31; B60K 35/28

USPC ............................................. 701/41
See application file for complete search history.

(56) References Cited

U.S. PATENT DOCUMENTS

| | | | | |
|---|---|---|---|---|
| 2018/0178714 | A1* | 6/2018 | Fujii | B60W 30/16 |
| 2020/0307595 | A1 | 10/2020 | Kato et al. | |
| 2022/0324473 | A1* | 10/2022 | Gläser | B60W 50/14 |
| 2023/0191911 | A1* | 6/2023 | Izumi | B60K 35/10 |
| | | | | 701/36 |

FOREIGN PATENT DOCUMENTS

| | | |
|---|---|---|
| JP | 2017-030727 A | 2/2017 |
| JP | 2018-103767 A | 7/2018 |
| JP | 2020-163907 A | 10/2020 |

* cited by examiner

*Primary Examiner* — Scott A Reinbold
(74) *Attorney, Agent, or Firm* — Oliff PLC

(57) ABSTRACT

A vehicle control device includes: a processor; and a steering-by-wire-type electric steering device, which is provided at a vehicle, and which is configured to switch between a first state in which a wheel is steered when a steering wheel is subjected to a rotation operation, and a second state in which the wheel is not steered when the steering wheel is subjected to a rotation operation, in which the processor is configured to execute lane change assistance control, which controls the electric steering device so as to move the vehicle to a target lane selected by a rotation operation of the steering wheel, the target lane being a different lane from a travel lane in which the vehicle is traveling, when the electric steering device of the vehicle is in the second state and the steering wheel has been subjected to a rotation operation.

4 Claims, 6 Drawing Sheets

VEHICLE CONTROL DEVICE

CROSS-REFERENCE TO RELATED APPLICATION

This application is based on and claims priority under 35 USC 119 from Japanese Patent Application No. 2022-191786 filed on Nov. 30, 2022, the disclosure of which is incorporated by reference herein.

BACKGROUND

Technical Field

The present disclosure relates to a vehicle control device.

Related Art

Japanese Patent Application Laid-open (JP-A) No. 2018-103767 discloses a vehicle including a turn signal lever (winker lever). When the turn signal lever of the vehicle is moved to a predetermined position, the control device of the vehicle causes the vehicle to execute lane change assistance control (LCA).

A case is assumed in which the vehicle is traveling in the leftmost lane of a road having three lanes. A case is further assumed in which a vehicle occupant uses the LCA to move the vehicle to a middle lane in a left-right direction and from the middle lane to a rightmost lane. In this case, when an occupant moves the turn signal lever to a predetermined position while the vehicle is traveling in the leftmost lane, the vehicle is moved to the middle lane by the LCA. Moreover, when an occupant moves the turn signal lever to a predetermined position while the vehicle is traveling in the middle lane, the LCA causes the vehicle to move to the rightmost lane.

In this way, in the technique described in JP-A No. 2018-103767, when an occupant wishes to cause a vehicle to perform LCA across multiple lanes, prior to initiation of the LCA and after initiation of the LCA, an occupant is required to operate the turn signal lever.

In consideration of the above facts, the present disclosure aims to obtain a vehicle control device that enables a vehicle to be moved to a predetermined lane by lane change assistance control even if an occupant does not operate an operation member after starting the lane change assistance control.

SUMMARY

A vehicle control device of a first aspect includes a steering-by-wire-type electric steering device, which is provided at a vehicle, and which is configured to switch between a first state in which a wheel is steered when a steering wheel is subjected to a rotation operation, and a second state in which the wheel is not steered when the steering wheel is subjected to a rotation operation, and a processor configured to execute lane change assistance control, which controls the electric steering device so as to move the vehicle to a target lane selected by a rotation operation of the steering wheel, the target lane being a different lane from a travel lane in which the vehicle is traveling, when the electric steering device of the vehicle is in the second state and the steering wheel has been subjected to a rotation operation.

The electric steering device of the vehicle control device of the first aspect can be switched between a first state in which a wheel is steered when the steering wheel is rotated, and a second state in which the wheel is not steered when the steering wheel is rotated. Moreover, when the electric steering device of the vehicle traveling in the travel lane is in the second state and the steering wheel has been subjected to a rotation operation, the processor can execute lane change assistance control, which controls the electric steering device so as to move the vehicle to a target lane selected by the rotation operation of the steering wheel. As a result, the vehicle control device of the first aspect can move the vehicle to a target lane by means of lane change assistance control even if an occupant does not operate the steering wheel (operation member) after initiation of the lane change assistance control.

A vehicle control device of a second aspect is the first aspect, in which the vehicle is configured to execute driving assistance control, and the electric steering device is put into the second state when the driving assistance control is executed at a level 3 or higher.

According to the vehicle control device of the second aspect, the electric steering device enters the second state when driving assistance control of level 3 or higher is executed. When driving assistance control of level 3 or higher is executed, the wheel is rotationally controlled by the driving assistance control. As a result, in a case in which the vehicle of the second aspect executes driving assistance control of level 3 or higher and the electric steering device enters the second state, an occupant can select a target lane without causing a problem in the steering of the vehicle, by rotating the steering wheel.

A vehicle control device of a third aspect is the first aspect, including an AR-HUD device that forms an AR image that moves in accordance with a rotation operation of the steering wheel, that is visible to an occupant of the vehicle through a front windshield of the vehicle, and that is configured to designate the travel lane or the target lane, in which, when the AR image is superimposed on the target lane, the processor is configured to move the vehicle to the target lane by means of the lane change assistance control.

The AR-HUD device of the vehicle control device of the third aspect forms an AR image that moves in accordance with a rotation operation of the steering wheel, and that designates a lane. The formed AR image is visible to an occupant of the vehicle through the front windshield. Moreover, when the AR image is superimposed on the target lane, the processor moves the vehicle to the target lane by means of lane change assistance control. Accordingly, the vehicle control device of the third aspect enables an occupant to recognize a selected target lane using the AR image, and can move the vehicle to the target lane using lane change assistance control.

As described above, the vehicle control device according to the present disclosure has an excellent advantageous effect of enabling the vehicle to be moved to a predetermined lane by lane change assistance control even if an occupant does not operate an operation member after initiation of lane change assistance control,

BRIEF DESCRIPTION OF THE DRAWINGS

Exemplary embodiments of the present disclosure will be described in detail based on the following figures, wherein.

DETAILED DESCRIPTION

Figure 1:
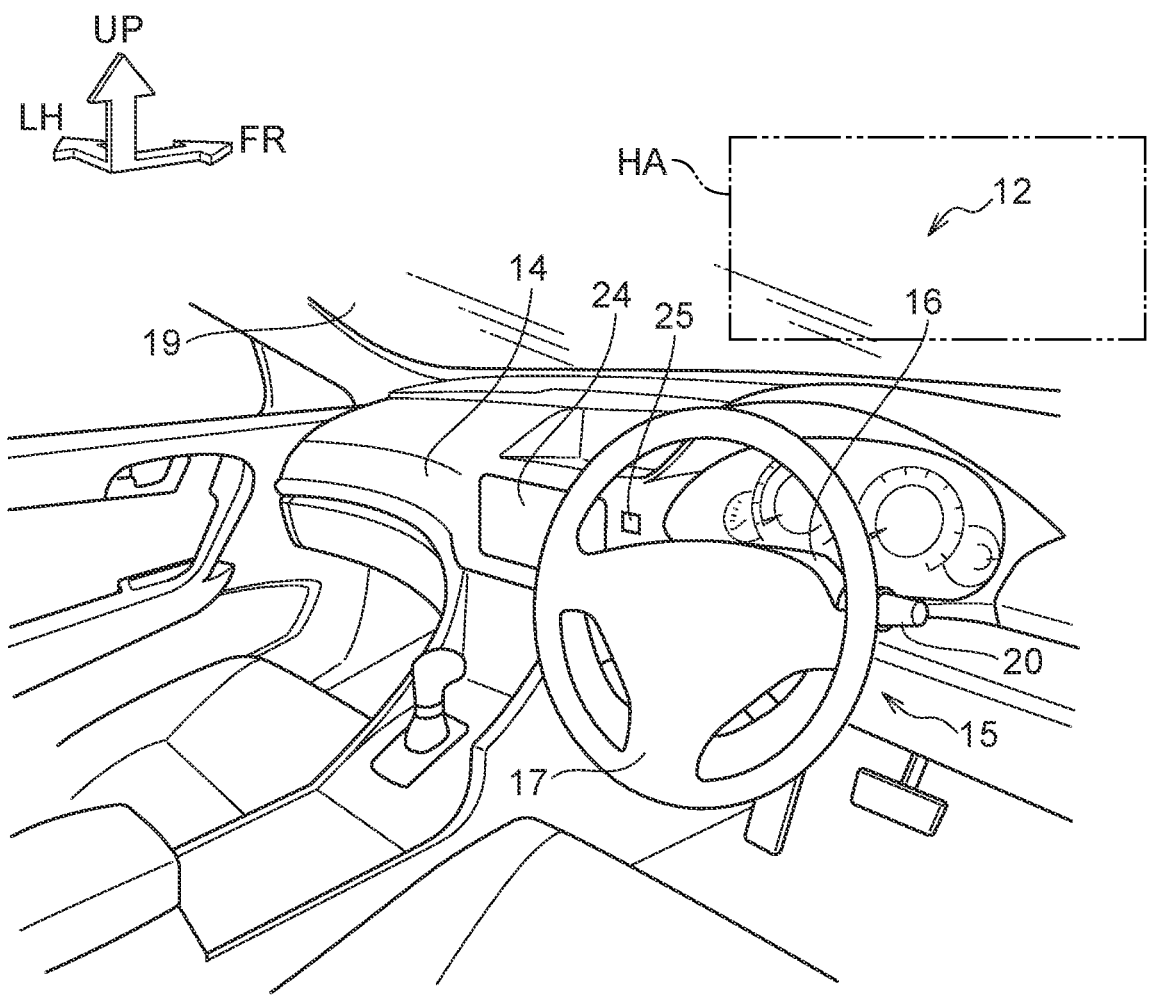
FIG. 1 is a diagram illustrating an inside of a vehicle provided with a vehicle control device according to an exemplary embodiment.

Explanation follows regarding an exemplary embodiment of a vehicle control device 10 according to the present disclosure, with reference to the drawings. An arrow FR illustrated in the drawings as appropriate indicates a front side in a front-rear direction of the vehicle, an arrow LH indicates a left side in a left-right direction of the vehicle, and an arrow UP indicates an upper side in a vertical direction of the vehicle.

Figure 4:
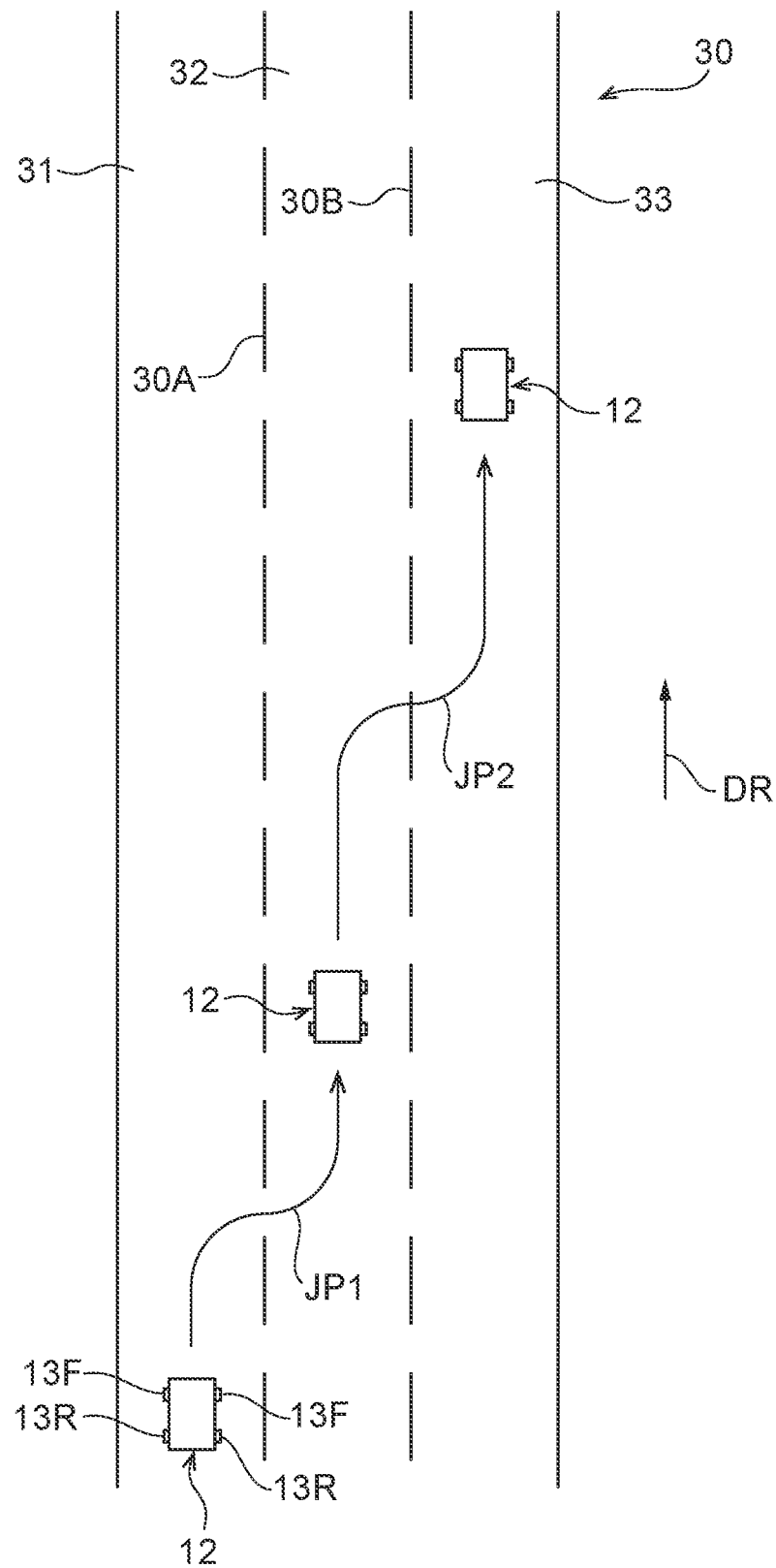
FIG. 4 is a schematic plan view illustrating the vehicle illustrated in FIG. 1 and a road along which the vehicle is traveling.

As illustrated in FIG. 4, a vehicle 12 in which the vehicle control device 10 is installed includes two front wheels 13F and two rear wheels 13R. The left and right front wheels 13F are steering wheels. As further illustrated in FIG. 1, the vehicle 12 includes a steering-by-wire electric steering device 15. The electric steering device 15 includes a steering wheel (operation member) 17, a steering shaft (not illustrated), a steering angle sensor 17a (see FIG. 2), an actuator 18 (see FIG. 2), and a deceleration mechanism (not illustrated).

As illustrated in FIG. 1, the vehicle 12 includes an instrument panel 14. A steering column 16 is provided at the instrument panel 14, and a steering wheel 17 is rotatably supported by the steering column 16. When the steering wheel 17 rotates, the actuator 18 is controlled based on the detection values of the steering angle sensor 17a (see FIG. 2) that detects the rotation angle of the steering shaft and a steering torque sensor (not illustrated) that detects the steering torque of the steering shaft. The drive force generated by the actuator 18 is transmitted to a rack bar (not illustrated) via a speed reduction mechanism or the like, and when the rack bar moves, the steering angles of the left and right front wheels 13F change. Moreover, the electric steering device 15 can be switched between a first state in which the front wheel 13F is steered when the steering wheel 17 is rotated, and a second state in which the front wheel 13F is not steered when the steering wheel 17 is rotated.

A turn signal lever 20 is movably supported at a right side portion of the steering column 16. The turn signal lever 20 is rotatable upward (counterclockwise) and downward (clockwise) with respect to the steering column 16 about a base end (left end) thereof. A position at which the axial line of the turn signal lever 20 is approximately parallel to the horizontal direction (left-right direction) is the initial position of the turn signal lever 20. When a driver (occupant; not illustrated) of the vehicle 12 applies an external force with respect to the turn signal lever 20, the turn signal lever 20 rotates to a left LCA operation position above the initial position or to a right LCA operation position below the initial position (not illustrated). Moreover, when the external force is no longer applied to the turn signal lever 20 positioned at the left LCA operation position or the right LCA operation position, the turn signal lever 20 automatically moves back to the initial position. Moreover, the turn signal lever 20 is rotatable to a left lighting position above the left LCA operation position and a right lighting position below the right LCA operation position. The vehicle 12 includes a position sensor 20a (see FIG. 2) that expresses the position of the turn signal lever 20. When the turn signal lever 20 is in the left LCA operation position or the left lighting position, the left turn signal provided at the front end portion of the vehicle 12 is illuminated. When the turn signal lever 20 is in the right LCA operation position or the right lighting position, the right turn signal provided at the front end portion of the vehicle 12 is illuminated.

Figure 2:
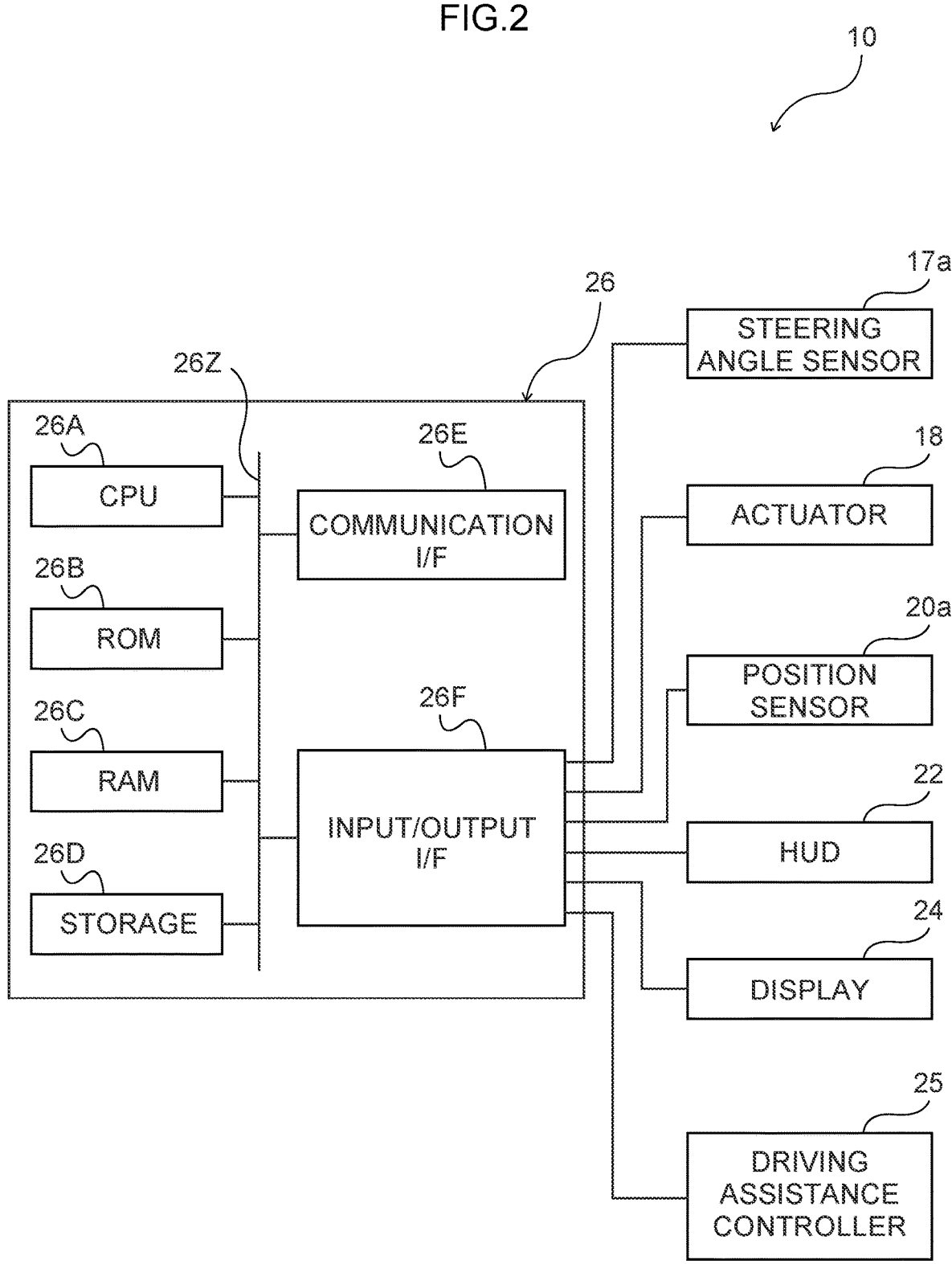
FIG. 2 is a diagram illustrating a hardware configuration of the vehicle illustrated in FIG. 1.

As illustrated in FIG. 2, the vehicle 12 includes an AR-HUD (head-up display) device 22 (hereafter "HUD") including a projection device.

As illustrated in FIG. 1 and FIG. 2, the instrument panel 14 is provided with a display 24. Moreover, the instrument panel 14 is provided with a driving assistance controller 25. The driving assistance controller 25 is a device that causes the vehicle 12 to execute driving assistance control, described below. When the driving assistance controller 25 is in the ON state, the vehicle 12 is capable of executing driving assistance control. When the driving assistance controller 25 is in the OFF state, the vehicle 12 is unable to execute driving assistance control.

As illustrated in FIG. 2, the vehicle 12 includes an electronic control unit (ECU) 26 as hardware configuration.

The ECU 26 is configured including a central processing unit (CPU) (processor) (computer) 26A, read only memory (ROM) (non-transitory recording medium) (recording medium) 26B, random access memory (RAM) 26C, storage (non-transitory recording medium) (recording medium) 26D, a communication I/F 26E, and an input/output I/F 26F. The CPU 26A, the ROM 26B, the RAM 26C, the storage 26D, the communication I/F 26E, and the input/output I/F 26F are connected so as to be capable of communicating with each other through an internal bus 26Z.

The CPU 26A is a central processing unit that executes various programs and controls various units. The CPU 26A reads a program from the ROM 26B or the storage 26D, and executes the program using the RAM 26C as a workspace. The CPU 26A controls the respective configurations and performs various computation processing in accordance with a program stored in the ROM 26B or the storage 26D.

The ROM 26B holds various programs and various data. The RAM 26C serves as a workspace to temporarily store programs and data. The storage 26D is configured by a storage device such as a hard disk drive (HDD) or a solid state drive (SSD), and holds various programs and various data.

The communication I/F 26E is an interface for connecting to a different ECU (not illustrated) from the ECU 26 through an external bus (not illustrated). For example, a communication protocol based on the CAN protocol is used as the interface.

The input/output I/F 26F is an interface for communicating with various devices. These devices include the steering angle sensor 17a, the actuator 18, the position sensor 20a, the HUD 22, the display 24, the driving assistance controller 25, a sensor group (described later), and an actuator group (described later).

Figure 3:
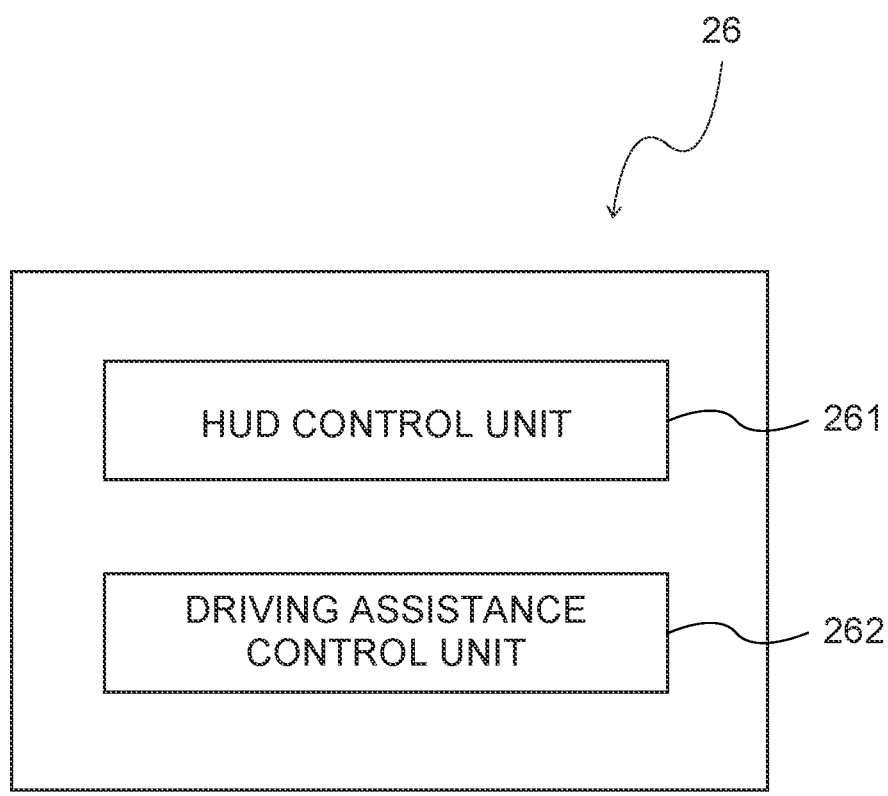
FIG. 3 is a functional block diagram of the ECU illustrated in FIG. 2.

FIG. 3 is a block diagram illustrating an example of functional configuration of the ECU 26. The ECU 26 includes an HUD control unit 261 and a driving assistance control unit 262 as functional configuration. The HUD control unit 261 and the driving assistance control unit 262 are implemented by the CPU 26A reading and executing a program stored in the ROM 26B.

The HUD control unit 261 controls the HUD 22. The ROM 26B or the storage 26D of the display control ECU 26 holds projection data including various characters, icons (graphics), and the like. A projection device of the HUD 22 controlled by the HUD control unit 261 reads projection object data from the ROM 26B or the storage 26D to project various types of AR images. These AR images include a target lane display image Imx, described later. Namely, the HUD 22 is an Augmented Reality Head-Up Display (AR-HUD). The projection device that has read the projection object data projects an AR image, and the projected AR image is reflected forward by a reflection section (not illustrated) provided in the vehicle 12. Moreover, the AR image reflected forward by the reflection section is formed as a virtual image in the virtual display region HA (see FIG. 5) located ahead of the front windshield 19.

As described further below, when the electric steering device 15 is switched to the second state owing to driving assistance control at level 3, 4, or 5, the HUD control unit 261 forms a target lane display image Imx (see FIG. 5) based on the detection value of the steering angle sensor 17*a* on the virtual display region HA so as to be superimposed on the lane in which the vehicle 12 is traveling. The target lane display image Imx of the present exemplary embodiment is an image representing the shape of the vehicle 12. Note that in the present specification, the target lane display image Imx superimposed on a lane of a road means that the target lane display image Imx is formed on the virtual display region HA so that the driver visually recognizes that the target lane display image Imx is superimposed on the lane.

Moreover, when the electric steering device 15 is in the second state, the HUD control unit 261 moves the target lane display image Imx in the left-right direction on the virtual display region HA based on the detection value of the steering angle sensor 17*a*. For example, when the steering angle sensor 17*a* detects that the steering wheel 17 has been rotated counterclockwise by a predetermined steering angle, the HUD control unit 261 moves the target lane display image Imx to the left on the virtual display region HA. Moreover, when the steering angle sensor 17*a* detects that the steering wheel 17 has been rotated clockwise by a predetermined steering angle, the HUD control unit 261 moves the target lane display image Imx to the right on the virtual display region HA. Whichever direction the steering wheel 17 rotates in, the magnitude of the steering angle expressed by the steering angle sensor 17*a* and the amount of movement of the target lane display image Imx are proportional.

When the driving assistance controller 25 is in the ON state, the driving assistance control unit 262 uses a group of sensors and an actuator group (both of which are not illustrated) provided in the vehicle 12, and causes the vehicle 12 to execute driving assistance control at driving levels 1 to 5 stipulated by the Society of Automotive Engineers (SAE) (American Society of Automobile Engineers). Moreover, when the driving assistance controller 25 is in the ON state, an occupant of the vehicle 12 can select a driving level and driving assistance control to be performed by operating the driving assistance controller 25. The driving assistance control of the present exemplary embodiment includes ACC (adaptive cruise control), LTA (lane tracing assistance, lane maintenance assistance control), and LCA (lane change assistance, lane change assistance control). The sensors provided in the vehicle 12 include plural cameras (not illustrated) provided in the vehicle 12, a millimeter-wave radar (not illustrated) that transmits scanning waves and receives reflected waves, and a LIDAR (Laser Imaging Detection and Ranging) (not illustrated) that scans ahead of the vehicle 12. The actuators provided in the vehicle 12 include an electric actuator for driving an internal combustion engine, which is a brake device and a drive source, actuator 18, and an electric motor, which is a drive source.

When driving assistance control is being performed at level 1 or level 2, or when driving assistance control is not being performed, the driving assistance control unit 262 switches the electric steering device 15 to the first state. Moreover, when driving assistance control is being performed at level 3, 4 or 5, the driving assistance control unit 262 switches the electric steering device 15 to the second state.

LCA is briefly described below. Note that it is assumed that the vehicle 12 is traveling on the road 30 illustrated in FIG. 4 and FIG. 5. The road 30 includes a first lane 31, a second lane 32, and a third lane 33. The first lane 31 and the second lane 32 are partitioned by a partition line 30A, and the second lane 32 and the third lane 33 are partitioned by a partition line 30B. The arrow DR in FIG. 4 indicates the travel direction of the vehicle 12.

The LCA is position control in a lateral direction (lane width direction) with respect to a lane of the vehicle 12. LCA is initiated when level 1 or 2 driving assistance control is selected and the turn signal lever 20 is moved to a left LCA operating position or a right LCA operating position during execution of LTA and ACC. When LCA is started, based on information acquired from the sensor group, the CPU 26A (driving assistance control unit 262) monitors the surroundings of the vehicle 12. Moreover, after determining that the vehicle 12 is able to safely execute a lane change, the CPU 26A executes the LCA. When the LCA is executed, the actuator group is controlled so as to move from a travel lane, which is the lane in which the vehicle 12 is currently traveling, to a lane that is different from the travel lane. The LCA of the present exemplary embodiment includes first lane change assist control (LCA) and second lane change assist control (LCA).

For example, during execution of driving assistance control at level 1 or 2, after it has been determined that the vehicle 12 traveling in the first lane 31 illustrated in FIG. 4 is safely movable from a first lane (travel lane) 31 to a second lane (adjacent lane) 32, which is a lane adjacent to the first lane 31, the first LCA constitutes control to move the vehicle 12 from the first lane 31 to the second lane 32 along the arrow JP1. When the turn signal lever 20 is positioned at the right LCA operation position for a period of time that is less than a first threshold value and that is equal to or longer than a predetermined value, the driving assistance control unit 262 executes the first LCA, and the vehicle 12 is moved to the second lane 32. Note that in a case in which the vehicle 12 that is executing driving assistance control at level 1 or 2 is traveling in the second lane 32, and the turn signal lever 20 is positioned at the left side LCA operation position for a period of time that is less than a first threshold value and that is equal to or longer than a predetermined value, the first LCA causes the vehicle 12 to move from the second lane (travel lane) 32 to the first lane (adjacent lane) 31.

Moreover, during execution of driving assistance control at level 1 or 2, after it has been determined that the vehicle 12 traveling in the first lane 31 is safely movable to the second lane 32, the vehicle 12 is moved from the first lane 31 to the second lane 32, and after it has been determined that the vehicle 12 is safely movable to the third lane (distant lane) 33, a second LCA constitutes control to move the vehicle 12 from the second lane 32 to the third lane 33. Note that a distant lane is a lane on the opposite side of the adjacent lane from the travel lane. When the turn signal lever 20 is positioned at the right LCA operation position over a period of time equal to or longer than the first threshold, the driving assistance control unit 262 executes the second LCA, and the vehicle 12 is moved to the second lane 32 along the arrow JP1, and then moved to the third lane 33 along the arrow JP2. Note that in a case in which the vehicle 12 that is executing driving assistance control at level 1 or 2 is traveling in the third lane 33 and the turn signal lever 20 is positioned at the left LCA operation position over a period of time equal to or longer than the first threshold, the vehicle 12 is moved from the third lane (travel lane) 33 to the first lane (distant lane) 31.

Figure 5:
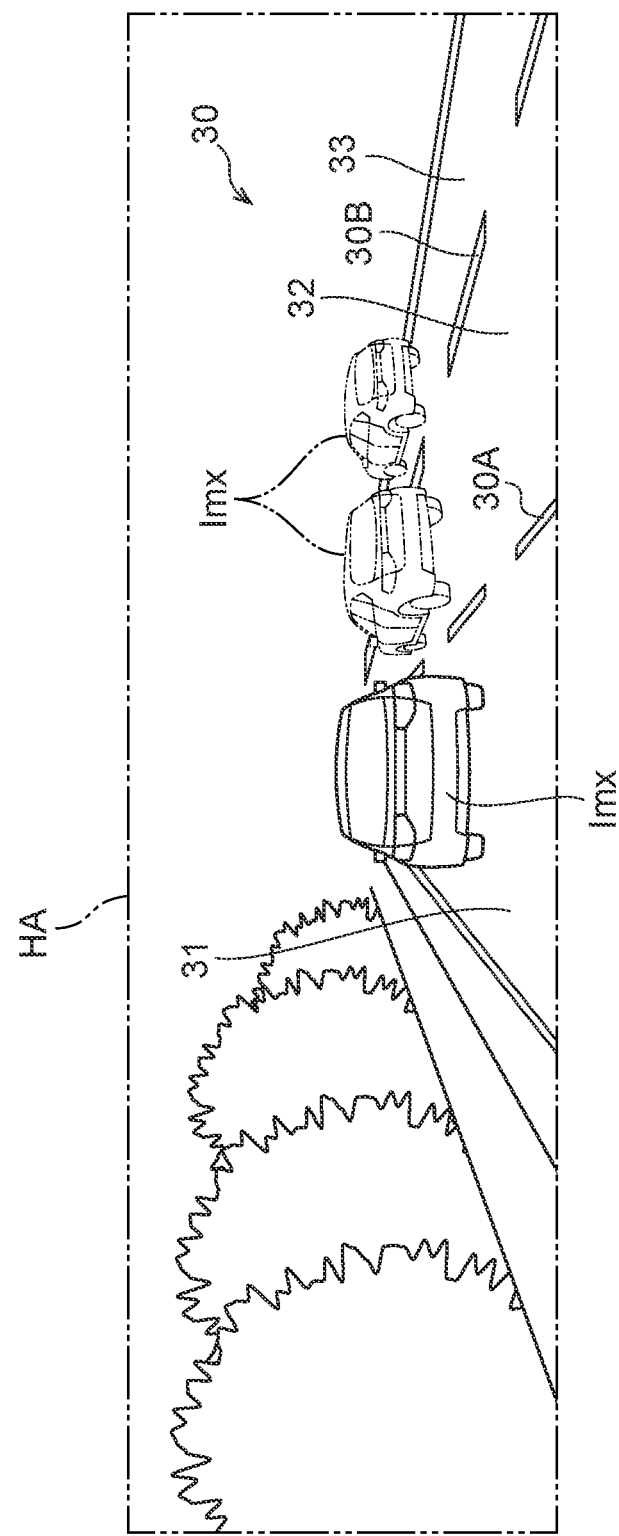
FIG. 5 is a diagram illustrating a region ahead of a vehicle and a target lane display image viewed through a front windshield.

Moreover, during execution of driving assistance control at level 3, 4, or 5, the driving assistance control unit 262 is capable of executing the first LCA and the second LCA by controlling the actuator group without rotating the steering wheel 17. A case is assumed in which the target lane display image Imx is formed in the virtual display region HA so as to be superimposed on the first lane (travel lane) 31 during travel of the vehicle 12 owing to execution of level 3 driving assistance control, for example. When the driver rotates the steering wheel 17 clockwise, as illustrated in FIG. 5, the target lane display image Imx moves rightward on the virtual display region HA by an amount corresponding to the steering angle of the steering wheel 17 detected by the steering angle sensor 17a. Moreover, for example, when the target lane display image Imx has moved to a position superimposed on the second lane 32, when the driver releases his/her hand from the steering wheel 17, the target lane display image Imx on the virtual display region HA is fixed at a position superimposed on the second lane 32 for a time equal to or longer than a threshold time. This threshold time is, for example, 2 seconds. When the state in which the target lane display image Imx is superimposed on the second lane 32 has been maintained for the threshold time or longer, the target lane is selected, and the driving assistance control unit 262 executes the first LCA. This causes the vehicle 12 to move to the second lane 32.

Further, a case is assumed in which the vehicle 12 that is currently executing driving assistance control at level 3, 4, or 5 is traveling in the second lane 32, and the steering wheel 17 is rotated counterclockwise so as to fix the target lane display image Imx at a position superimposed on the first lane 31 for a time equal to or longer than the threshold time. In this case, the driving assistance control unit 262 executes the first LCA, and the vehicle 12 is moved from the second lane 32 to the first lane 31.

Moreover, a case is assumed in which the target lane display image Imx is formed in the virtual display region HA so as to be superimposed on the first lane (travel lane) 31 during travel of the vehicle 12 owing to execution of, for example, level 3 driving assistance control. Moreover, a case is assumed in which, when the driver rotates the steering wheel 17 in a clockwise direction, the target lane display image Imx moves from a position superimposed on the first lane 31 to a position superimposed on the third lane 33, and the target lane display image Imx is fixed at a position superimposed on the third lane 33 for a threshold time or longer. In this case, the driving assistance control unit 262 executes the second LCA, and the vehicle 12 is moved from the first lane 31 to the third lane 33.

Further, a case is assumed in which the vehicle 12 that is currently executing driving assistance control at level 3, 4, or 5 is traveling in the third lane 33, and the steering wheel 17 is rotated clockwise so as to fix the target lane display image Imx at a position superimposed on the first lane 31 for a time equal to or longer than the threshold time. In this case, the driving assistance control unit 262 executes the second LCA, and the vehicle 12 is moved from the third lane 33 to the first lane 31.

The electric steering device 15, the position sensor 20a, the HUD 22, the driving assistance controller 25, the ECU 26, the sensor group, and the actuator group are constituent elements of the vehicle control device 10.

Next, explanation follows regarding processing executed by the CPU 26A of the ECU 26. The CPU 26A repeatedly executes the processing of the flowchart illustrated in FIG. 6 each time a predetermined time has elapsed. At the start of this processing, it is assumed that the vehicle 12 is traveling in the first lane 31 of the road 30 illustrated in FIG. 4, and the target lane display image Imx is formed so as to be superimposed on the first lane 31.

At step S10 (hereinafter, the term "step" is omitted), the CPU 26A determines whether or not the vehicle 12 is executing driving assistance control at level 3 or higher.

In a case in which the determination at S10 is YES, the CPU 26A advances to S11 to determine whether or not the steering wheel 17 has been rotated.

In a case in which the steering wheel 17 has been rotated, the CPU 26A advances to S12, and based on the steering angle detected by the steering angle sensor 17a, the target lane display image Imx is moved in the left-right direction on the virtual display region HA.

After completing the processing of S12, the CPU 26A advances to S13, and it is determined whether or not the target lane display image Imx has remained fixed for a time equal to or longer than a threshold time at a position superimposed on a target lane, which is a lane different from the first lane 31. For example, in a case in which the target lane display image Imx is fixed at a position superimposed on the second lane 32 for a period of time equal to or longer than a threshold time, the CPU 26A determines YES at S13, and proceeds to S14.

At S14, the CPU 26A executes LCA so as to move the vehicle 12 to the selected target lane using the steering wheel 17. For example, in a case in which the target lane display image Imx is superimposed on the second lane 32, the CPU 26A executes the first LCA. Moreover, in a case in which the target lane display image Imx is superimposed on the third lane 33, the CPU 26A executes the second LCA.

In a case in which the processing of S14 has ended, the CPU 26A advances to S15 to determine whether or not the LCA has ended.

Figure 6:
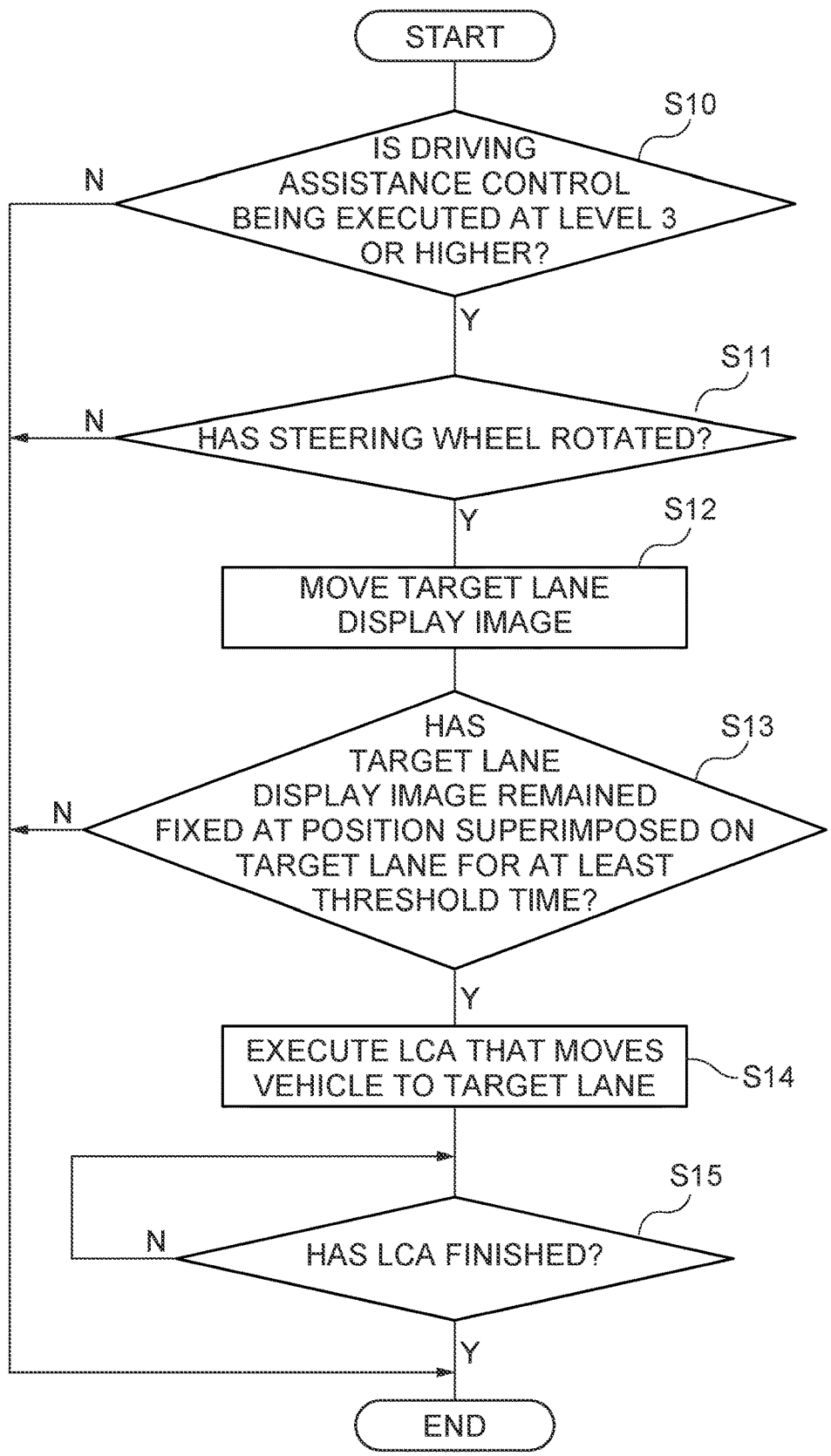
FIG. 6 is a flowchart illustrating processing executed by a CPU of an ECU.

In cases in which a NO determination has been made at S10, 11, or 13, or in which a YES determination has been made at S15, the CPU 26A temporarily ends the processing of the flowchart of FIG. 6.

As described above, the steering-by-wire electric steering device 15 of the vehicle 12 of the present exemplary embodiment can switch between a first state in which the front wheel 13F is steered when the steering wheel 17 is rotated, and a second state in which the front wheel 13F is not steered when the steering wheel 17 is rotated. Moreover, in the vehicle control device 10, when the electric steering device 15 of the vehicle 12 that is traveling in the travel lane is in the second state and the steering wheel 17 is rotated, the first LCA or the second LCA is executed so as to move the vehicle 12 to the target lane selected by rotation of the steering wheel 17. Accordingly, the vehicle control device 10 of the present exemplary embodiment can move the vehicle 12 to a target lane by means of LCA even if the driver does not operate the steering wheel 17 after the LCA has started.

Moreover, the vehicle control device 10 switches the electric steering device 15 to the second state when driving assistance control at level 3 or higher is executed. When driving assistance control at level 3 or higher is executed, the vehicle control device 10 controls the actuator group without rotating the steering wheel 17 so as to control rotation of the front wheels 13F. Accordingly, in a case in which driving assistance control at level 3 or higher is executed and the electric steering device 15 is in the second state, the driver can select a target lane without causing a problem in the steering of the vehicle 12, by rotating the steering wheel 17.

Moreover, the HUD 22 forms a target lane display image Imx that moves in response to a rotation operation of the steering wheel 17 and designates a lane. Moreover, the formed target lane display image Imx is visible to a driver of the vehicle 12 through the front windshield 19. Accordingly, the vehicle control device 10 can enable the driver to recognize the selected target lane using the target lane display image Imx.

Although explanation has been given regarding the vehicle control device 10 according to the exemplary embodiment, the vehicle control device 10 may be appropriately modified in design within a range not departing from the spirit of the present disclosure.

For example, a road may have four or more lanes. A case is assumed in which the road has four lanes and the vehicle 12 is located in the travel lane, which is the leftmost lane. In this case, the lane to the right of the travel lane is an adjacent lane, the lane to the right of the adjacent lane is a first distant lane (distant lane), and the lane to the right of the first distant lane is a second distant lane (distant lane). In this case, too, in a case in which the target lane display image Imx is formed so as to be superimposed on the first distant lane or the second distant lane by operation of the steering wheel 17, the second LCA moves the vehicle 12 to the first distant lane or the second distant lane.

The display 24 may display a road image representing a road along which the vehicle 12 is traveling, and an image corresponding to the target lane display image Imx. In this case, when driving assistance control at level 3 or higher is executed and the steering wheel 17 is rotated, an image corresponding to the target lane display image Imx is moved in the left-right direction on the display 24 by an amount based on the steering angle detected by the steering angle sensor 17a. Moreover, when a state in which the target lane display image Imx is superimposed on an image representing a predetermined lane of the road image is maintained for a period of time equal to or longer than a threshold time, selection of the target lane is performed.

The selection of the target lane may be executed when a predetermined selection device is operated in a case in which the target lane display image Imx has been superimposed on an image representing the target lane of the road or the target lane of the road image. For example, after the target lane display image Imx has moved from a position superimposed on the first lane 31 to a position superimposed on the second lane 32, selection of a target lane may be performed when the turn signal lever 20, which is the selection device, is moved to the right LCA operation position. Moreover, after the target lane display image Imx has moved from the position superimposed on the second lane 32 to the position superimposed on the first lane 31, selection of a target lane may be performed when the turn signal lever 20, which is the selection device, is moved to the left LCA operation position.

What is claimed is:

1. A vehicle control device, comprising:
an electronic control unit;
a turn signal lever provided on a steering column of a vehicle; and
a steering-by-wire electric steering device, which is provided at the vehicle, the steering-by-wire electric steering device including (i) a steering wheel provided on the steering column of the vehicle, (ii) a steering angle sensor that senses a steering amount of the steering wheel, and (iii) an actuator that causes a wheel of the vehicle to be steered, the steering-by-wire electric steering device being configured to switch between a first state in which the wheel of the vehicle is steered by the actuator based on the steering amount sensed by the steering angle sensor when the steering wheel of the vehicle is subjected to a rotation operation, and a second state in which the rotation operation of the steering wheel of the vehicle selects a target lane for the vehicle to be moved to by a lane change assistance operation, wherein
the electronic control unit is configured to execute driving assistance control that includes the lane change assistance operation,
the electronic control unit is configured to, when the driving assistance control is executed at a level 3 or higher, place the steering-by-wire electric steering device into the second state and perform the lane change assistance operation by controlling the actuator of the steering-by-wire electric steering device to turn the wheel of the vehicle to move the vehicle to the target lane selected by the rotation operation of the steering wheel, the target lane being a different lane from a travel lane in which the vehicle is traveling, and
the electronic control unit is configured to, when the driving assistance control is executed at a level 2 or lower, place the steering-by-wire electric steering device into the first state and perform the lane change assistance operation by controlling the actuator of the steering-by-wire electric steering device to turn the wheel of the vehicle to move the vehicle to the target lane, the target lane being selected by operation of the turn signal lever.

2. The vehicle control device according to claim 1, further comprising an Augmented Reality Head-Up-Display (AR-HUD) that forms an AR image that moves in accordance with the rotation operation of the steering wheel, that is visible to the driver of the vehicle through a front windshield of the vehicle, and that is configured to designate the travel lane or the target lane,
wherein, the electronic control unit is configured to, when the AR image is superimposed on the target lane and the steering-by-wire electric steering device is in the second state, move the vehicle to the target lane by executing the lane change assistance operation.

3. The vehicle control device according to claim 2, wherein an amount of movement of the AR image is proportional to a steering angle of the steering wheel detected by the steering angle sensor.

4. The vehicle control device according to claim 2, wherein the lane change assistance operation is executed once a position of the AR image is maintained superimposed on the target lane for a time period that is equal to or greater than a threshold time period.

* * * * *